(12) United States Patent
Tsutsumi et al.

(10) Patent No.: US 10,232,775 B2
(45) Date of Patent: Mar. 19, 2019

(54) ELECTRIC DRIVE VEHICLE

(71) Applicant: Hitachi Construction Machinery Co., Ltd., Tokyo (JP)

(72) Inventors: Yoshiaki Tsutsumi, Tsuchiura (JP); Naoki Tatsuzawa, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 100 days.

(21) Appl. No.: 15/409,569

(22) Filed: Jan. 19, 2017

(65) Prior Publication Data
US 2017/0259740 A1    Sep. 14, 2017

(30) Foreign Application Priority Data
Mar. 10, 2016  (JP) .................................. 2016-047435

(51) Int. Cl.
| | |
|---|---|
| *B60R 1/00* | (2006.01) |
| *G06T 7/70* | (2017.01) |
| *B60L 5/00* | (2006.01) |
| *B60L 9/18* | (2006.01) |
| *H04N 5/265* | (2006.01) |
| *H04N 7/18* | (2006.01) |
| *H04N 5/225* | (2006.01) |

(52) U.S. Cl.
CPC ................ *B60R 1/002* (2013.01); *B60L 5/00* (2013.01); *B60L 9/18* (2013.01); *G06T 7/70* (2017.01); *H04N 5/2257* (2013.01); *H04N 5/265* (2013.01); *H04N 7/183* (2013.01); *B60L 2200/30* (2013.01); *B60L 2200/40* (2013.01); *B60R 2300/30* (2013.01); *B60R 2300/607* (2013.01); *B60R 2300/802* (2013.01); *B60Y 2400/92* (2013.01)

(58) Field of Classification Search
CPC .............. B60R 1/002; G06T 7/70; B60L 5/00
USPC ........................................................ 348/148
See application file for complete search history.

(56) References Cited

FOREIGN PATENT DOCUMENTS

JP         2005-94952 A      4/2005

*Primary Examiner* — Jeffery A Williams
(74) *Attorney, Agent, or Firm* — Mattingly & Malur, PC

(57) ABSTRACT

An electric drive vehicle is provided with first and second slider plates contacting a trolley line on the high-voltage side and on the ground side, respectively. A camera has a photographing range of the whole of the second slider plate held in contact with the trolley line on the ground side and a part of the trolley line residing around the second slider plate. A controller controls a display of a monitor, wherein the controller includes a relative distance calculation section that calculates a relative distance between the trolley line on the ground side and a reference position of the second slider plate, and a bird's eye view image data generation section that generates bird's eye view image data reflecting the relative distance calculated by the relative distance calculation section and that outputs the bird's eye view image data to the monitor.

5 Claims, 9 Drawing Sheets

ELECTRIC DRIVE VEHICLE

BACKGROUND

1. Field of the Invention

The present invention relates to an electric drive vehicle that travels in, for example, mines or like while receiving electric power from trolley lines and particularly, to a technology that displays information for supporting the driving of an electric drive vehicle.

2. Description of the Related Art

Where a dump truck is electrically driven to travel in a mine with trolley lines installed, it is requested to drive the dump truck so that a slider plate of a current collector provided on the dump truck movably up and down does not deviate from the trolley lines. There has been known a technology that controls the vertical position of a slider plate so as not to let the slider plate deviate from trolley lines. For example, Japanese Unexamined Patent Application Publication No. 2005-94952 describes a configuration wherein the image of a current collector section is taken by a camera from below, wherein the positional relation between the current collector section and trolley lines is calculated by analyzing the image taken by the camera, and wherein the current collector section is moved up and down based on the calculation result (refer to abstract).

However, the aforementioned Japanese Unexamined Patent Application Publication No. 2005-94952 places the premises on a trolley bus that travels urban districts with paved road surfaces, and thus, the situation that the trolley bus deviates from trolley lines in a right-left direction is hard to occur. Therefore, it is sufficient for the current collector section to be able to adjust the position of a slider plate in the vertical direction. However, in mines, the state of road surfaces is not necessarily satisfactory. In order for a dump truck not to deviate from trolley lines in a right-left direction, a driver of the dump track is required to manipulate a steering wheel while not only visually observing the situation ahead but also checking the relative position in the right-left direction between the trolley lines ahead and above and the dump truck through visual observation, and thus, the burden on the driver is heavy.

Therefore, in order to mitigate the burden on the driver, it is conceived to display on a monitor the image covering the slider plate and the trolley lines acquired by the camera described in, for example, the aforementioned Japanese Unexamined Patent Application Publication No. 2005-94952. However, because the prior art described in the Japanese Unexamined Patent Application Publication No. 2005-94952 is designed to take the images of the slider plate and the trolley lines from below with the camera, displaying the taken image on the monitor as it is gives rise to a problem that the driver has a difficulty in grasping the positional relation between the trolley lines and the vehicle body.

Further, in the Japanese Unexamined Patent Application Publication No. 2005-94952, a closed circuit is configured by two trolley lines, wherein one of the trolley lines is a high-voltage side while the other trolley line is a ground side. In this configuration, an anxiety arises in that the image accuracy of the camera will be deteriorated by suffering the influence of noise from the trolley line on the high-voltage side.

SUMMARY

The present invention has been made taking the aforementioned circumstances into consideration, and it is an object of the present invention to display information for supporting the driving easily to understand and precisely in an electric drive vehicle that travels while receiving electric power from trolley lines in, for example, mines and the like.

In order to accomplish the aforementioned object, the typical present invention resides in an electric drive vehicle that travels while receiving electric power from an electric power supply facility which completes an electric closed circuit by a trolley line on a high-voltage side and a trolley line on a ground side, and the electric drive vehicle includes: a first slider plate contacting the trolley line on the high-voltage side; a second slider plate contacting the trolley line on the ground side; a camera installed below the second slider plate for taking as a photographing range the whole of the second slider plate and a part of the trolley line on the ground side residing around the second slider plate; a monitor that displays information for supporting the driving; and a controller that controls the display of the monitor, wherein the controller has: a relative distance calculation section that inputs image data taken by the camera and that calculates the relative distance between the trolley line on the ground side and a reference position of the second slider plate; and a bird's eye view image data generation section that generates bird's eye view image data by synthesizing a second symbol image representing the trolley line on the ground side and the second slider plate which reflect the relative distance calculated by the relative distance calculation section, on a first symbol image representing the electric drive vehicle and that outputs the bird's eye view image data to the monitor.

According to the present invention, in the electric drive vehicle which travels while receiving electric power from the trolley lines, it is possible to display information for supporting the driver easily to understand and precisely. Incidentally, other objects, configurations and advantageous effects than those as aforementioned will be clarified by the description of the following embodiment.

BRIEF DESCRIPTION OF THE DRAWINGS

A non-limiting and non-exhaustive embodiment of the present invention will be described with reference to the following drawings, wherein like reference signs refer to like parts throughout various views unless otherwise specified.

DETAILED DESCRIPTION

Hereafter, an embodiment of the present invention will be described with reference to the drawings.

Figure 1:
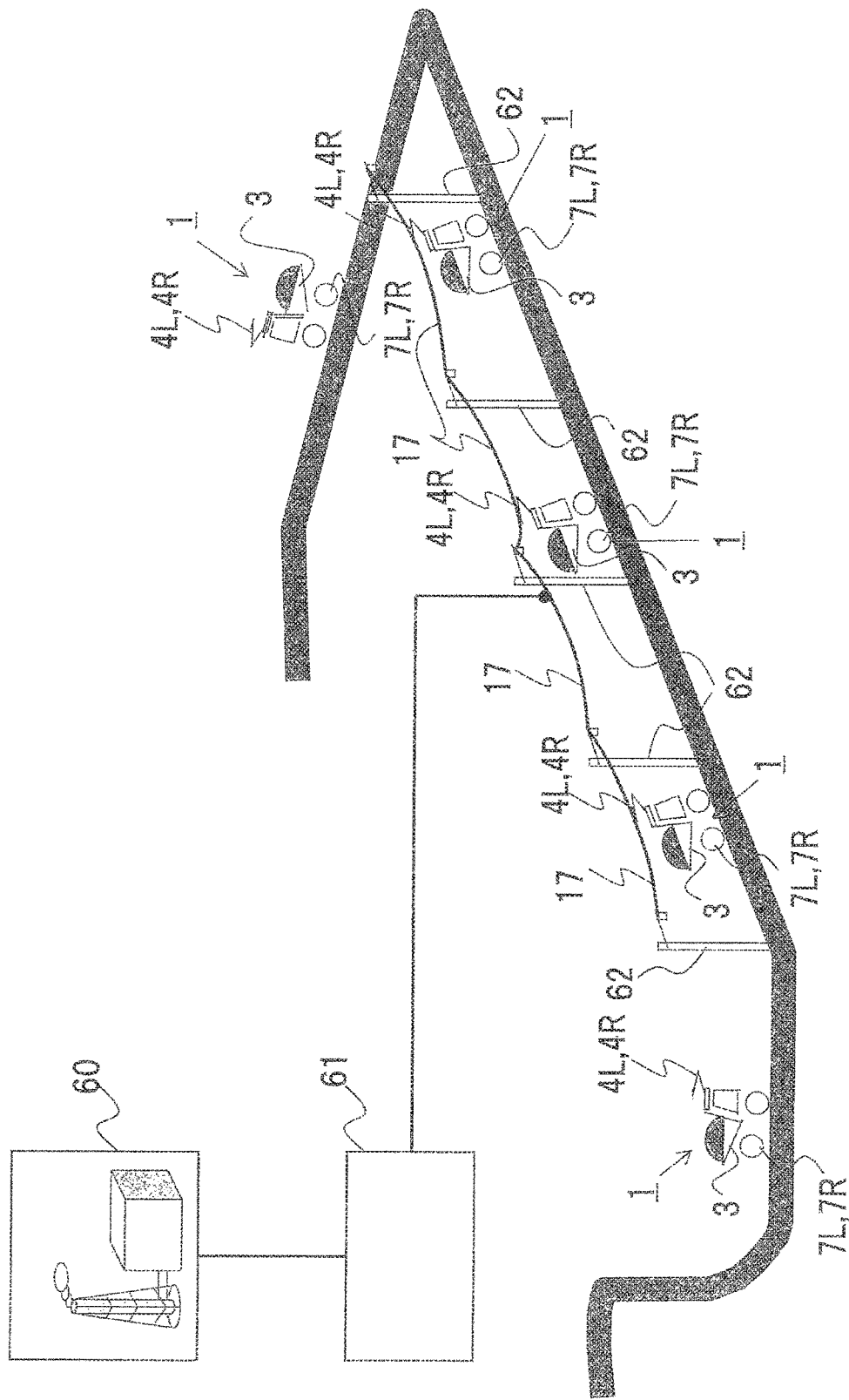
FIG. 1 is an illustration showing the overall configuration of a mine.

FIG. 1 is an illustration showing the overall configuration of a mine in which dump trucks, typically exemplifying an electric drive vehicle according to the present invention, travel. As shown in FIG. 1, a power plant 60 supplies a transformer substation 61 with alternating-current electric power. The transformer substation 61 steps down the supplied alternating-current electric power by transformers (not shown) and rectifies through a rectifier (not shown) to then supply trolley lines 17 (referred to later as 17L, 17R) with direct-current electric power. Each dump truck 1 receives electric power from the trolley lines 17 through current collectors 4L, 4R attached to a vehicle body 3 and drives motors/invertors being drive devices by the received electric power to rotate wheels (rear wheels) 7L, 7R provided on the vehicle body 3. In this way, the dump truck 1 travels on the slopes in the mine. Incidentally, numeral 62 denotes poles.

Figure 2:
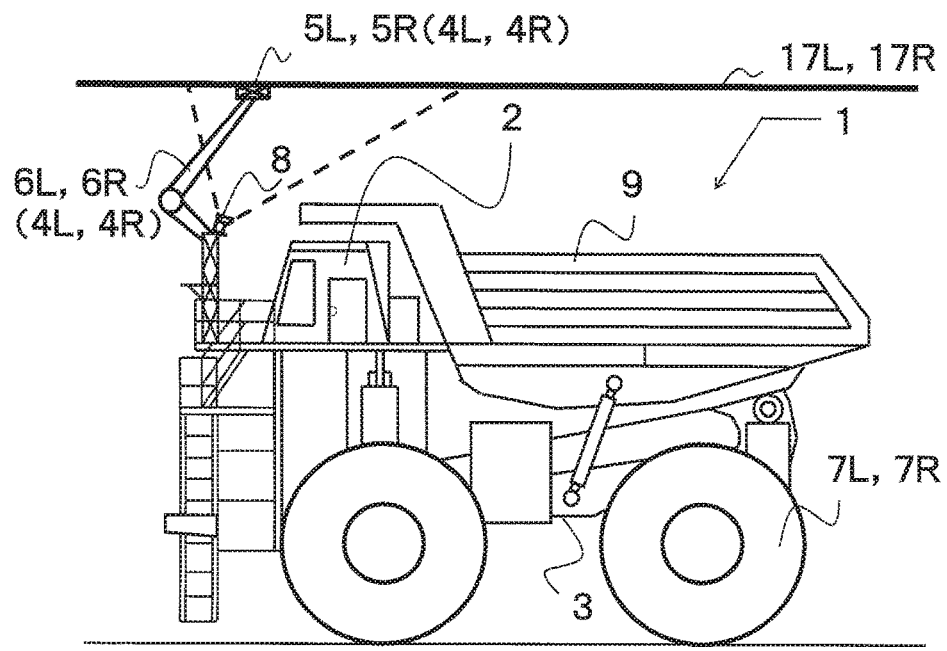
FIG. 2 is a side view of a dump truck according to an embodiment of the present invention.
Figure 3:
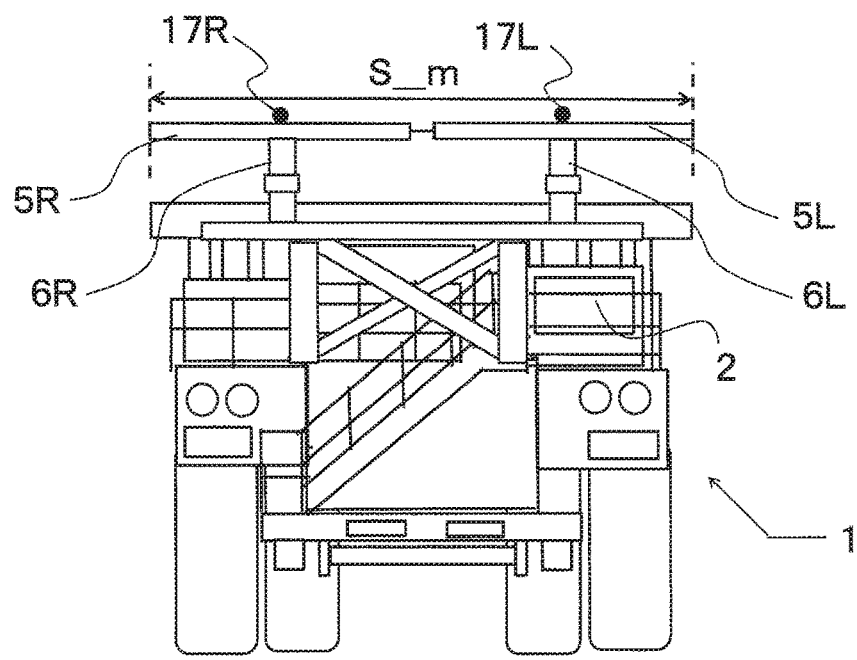
FIG. 3 is a front view of the dump truck shown in FIG. 2.
Figure 4:
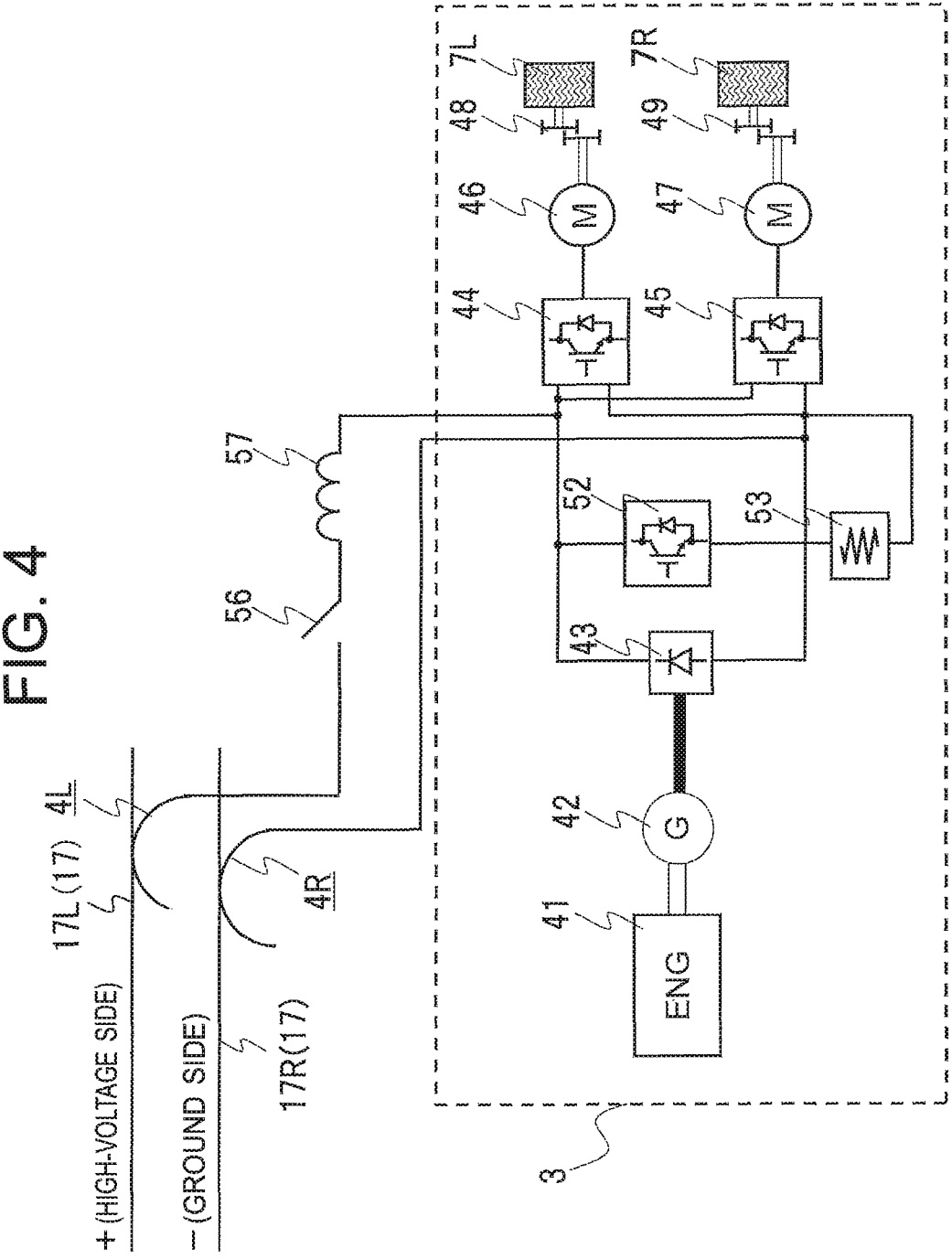
FIG. 4 is a schematic illustration showing the interior configuration in an electrical drive system of the dump truck shown in FIG. 2.

Next, the entire configuration of the dump truck 1 will be described. FIG. 2 is a side view of the dump truck according to the embodiment of the present invention, FIG. 3 is a front view of the dump truck, and FIG. 4 is an illustration showing the interior configuration in an electrical drive system of the dump truck. The dump truck 1 is configured having the vehicle body 3 provided with front wheels and the rear wheels 7L, 7R, a vessel 9 provided on a rear side of the vehicle body 3 for loading earth and sand or the like, a driver's cab 2 provided on the front left side of the vehicle body 3, the current collectors 4L, 4R and the like.

The current collector 4L is provided with a left slider plate 5L (first slider plate) held from below in contact with the trolley line 17L on a high-voltage side and a frame body 6L supporting the left slider plate 5L movably upward and downward. Likewise, the current collector 4R is provided with a right slider plate 5R (second slider plate) held from below in contact with the trolley line 17R on the ground side and a frame body 6R supporting the right slider plate 5R movably upward and downward. Incidentally, the left slider plate 5L and the right slider plate 5R are coupled through an electric insulator.

Further, as shown in FIG. 4, the dump truck 1 is configured so that the vehicle body 3 is provided with a diesel engine (ENG) 41, a generator (G) 42, a rectifier 43, inverters 44, 45, electric motors (M) 46, 47, reduction gears 48, 49, the wheels 7L, 7R, a chopper 52, a regeneration resistance 53, the current collectors 4L, 4R, an electromagnetic contactor 56, and a reactor 57.

The dump truck 1 according to the present embodiment is able to travel in two modes including a diesel mode and a trolley mode. In the diesel mode, the diesel engine 41 drives the generator 42, which outputs three-phase alternating-current electric power. The rectifier 43 rectifies the three-phase alternating-current electric power outputted from the generator 42 to convert the electric power into direct-current electric power and supplies the direct-current electric power to the inverter 44 and the inverter 45.

The inverter 44 converts the direct-current electric power supplied from the rectifier 43 into variable frequency alternating-current electric power and then supplies the variably frequency alternating-current electric power to the electric motor 46 to drive the electric motor 46. Likewise, the inverter 45 converts the direct-current electric power supplied from the rectifier 43 into variable frequency alternating-current electric power and then supplies the variably frequency alternating-current electric power to the electric motor 47 to drive the electric motor 47. The electric motor 46 is connected with the wheel 7L through the reduction gear 48, and the electric motor 46 is driven by the inverter 44, whereby the wheel 7L is rotated. The electric motor 47 is connected with the wheel 7R through the reduction gear 49, and the electric motor 47 is driven by the inverter 45, whereby the wheel 7R is rotated.

Next, description will be made regarding the operation during the traveling in the trolley mode. The trolley line 17L on the high-voltage side is connected to a direct-current circuit for the inverter 44 and the inverter 45 through the current collector 4L, the electromagnetic contactor 56 and the reactor 57. When the electromagnetic contactor 56 is turned to ON, the direct-current electric power is supplied from the trolley line 17L side to the inverter 44 and the inverter 45. The inverter 44 and the inverter 45 are connected with the trolley line 17R on the ground side through the current collector 4R. Thus, a closed circuit is electrically completed by the two trolley lines 17L, 17R.

The inverter 44 converts the direct-current electric power supplied from the trolley line 17L side into the variable-frequency alternating-current electric power and supplies the same to the electric motor 46 to drive the electric motor 46. Likewise, the inverter 45 converts the direct-current electric power supplied from the trolley line 17L side into the variable-frequency alternating-current electric power and supplies the same to the electric motor 47 to drive the electric motor 47. As is the same in the diesel mode, the electric motor 46 is driven by the inverter 44, and the electric motor 47 is driven by the inverter 45, so that the wheels 7L and the wheel 7R are rotated.

As mentioned above, in the diesel mode, the diesel engine 41 drives the generator 42, and the electric motors 46,47 are driven by the use of the electric power generated by the generator 42, whereby the dump truck 1 travels. In the trolley mode, the electric motors 46,47 are driven by the use of the electric power supplied from the trolley lines 17, whereby the dump truck 1 travels.

Further, the dump truck 1 according to the present embodiment is provided with a camera 8 at a front part of the vehicle body 3. The camera 8 is installed at a position where the camera 8 can take a picture image from below that covers the whole of the right slider plate 5R held in contact with the trolley line 17R on the ground side and a part of the trolley line 17R residing around the slider plate 5R. That is, the photographing range of the camera 8 is an area of a quadrilateral image area a-b-c-d covering the whole of the right slider plate 5R (refer to FIG. 7). The reason why not the left slider plate 5L but the right slider plate 5R is taken by the camera 8 is to preclude the possibility that the preciseness of the picture image taken by the camera 8 is deteriorated by the influences of noises attributed to the contact of the left slider plate 5L with the trolley line 17L on the high-voltage side. Incidentally, the camera 8 is set to be brought into a power ON to start the photographing automatically when a switching is made to the trolley mode.

Figure 5:
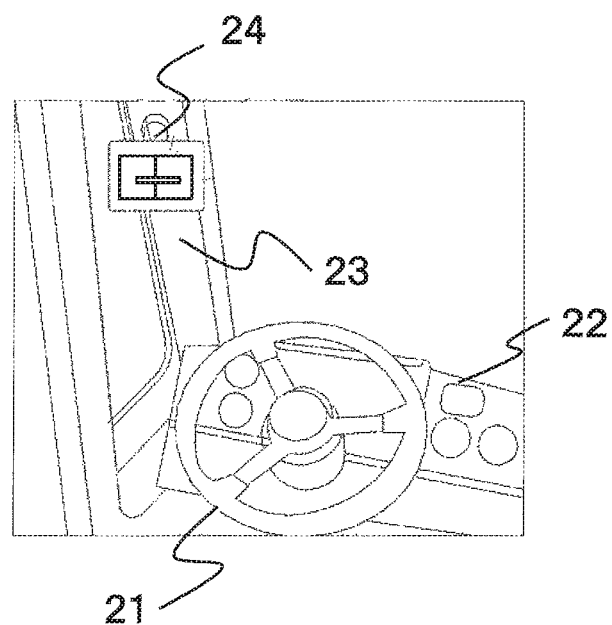
FIG. 5 is a fragmentary perspective view showing the interior of a driver's cab on the dump truck shown in FIG. 2.

Next, description will be made regarding the interior of the driver's cab 2 of the dump truck 1. FIG. 5 is a fragmentary perspective view showing the interior of the driver's cab 2 on the dump truck 1. As shown in FIG. 5, the driver's cab 2 is provided with a steering wheel 21 for performing the steering operation of the dump truck 1, a dashboard 22 that displays meters and the like, a monitor 24 that displays information for supporting the driving, and so on. The monitor 24 is attached to a pillar 23 at a position of the height meeting the driver's line of sight and, as will be described later, displays a bird's eye view image that depicts the relative position between the right slider plate 5R of the dump truck 1 and the trolley line 17R during the trolley mode.

Figure 6:
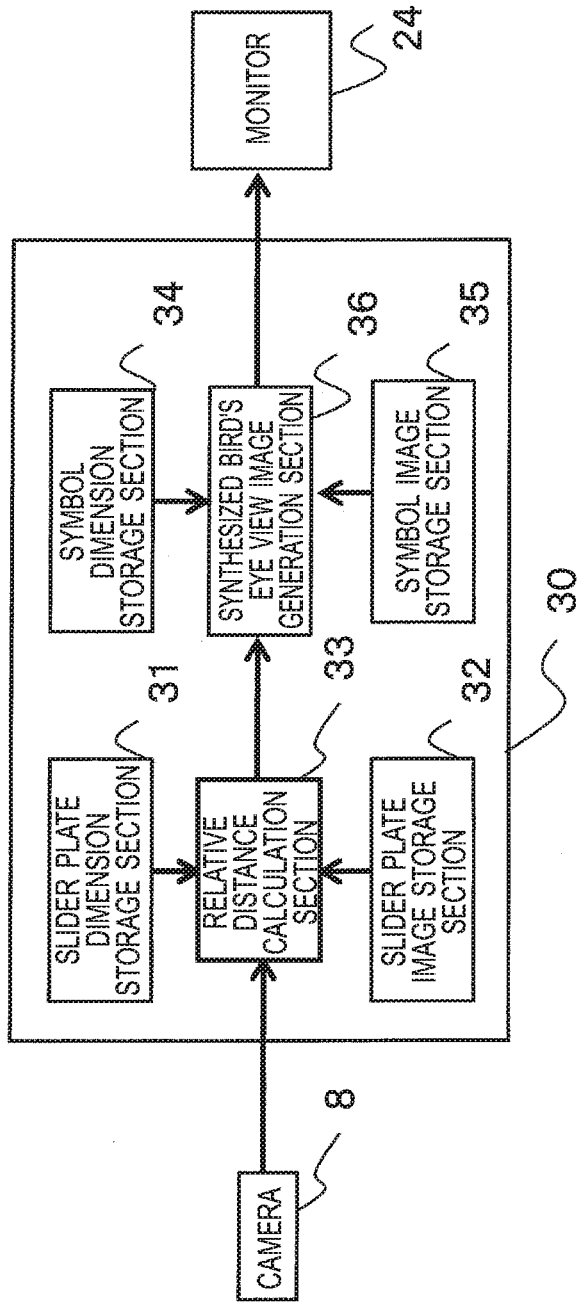
FIG. 6 is a block diagram of a controller for controlling the display of a monitor.

FIG. 6 is a block diagram of the controller 30 that executes the display control for the monitor 24. The controller 30 is provided with a slider plate dimension storage section 31 storing width dimension data of the right slider plate 5R, a slider plate image storage section (image pattern storage section) 32 storing a plurality of image patterns of the right slider plate 5R, an relative distance calculation section 33 that calculates the relative distance between the center (reference position) of the right slider plate 5R and the trolley line 17R, a symbol dimension storage section 34 that stores the number of pixels representing the vehicle width on a symbol image of the dump truck 1, a symbol image storage section 35 storing data that represents various symbol images for use in generating the bird's eye view image, and a synthesized bird's eye view image generation section (bird's eye view image data generation section) 36 that generates bird's eye view image data for display on the monitor 24.

Figure 7:
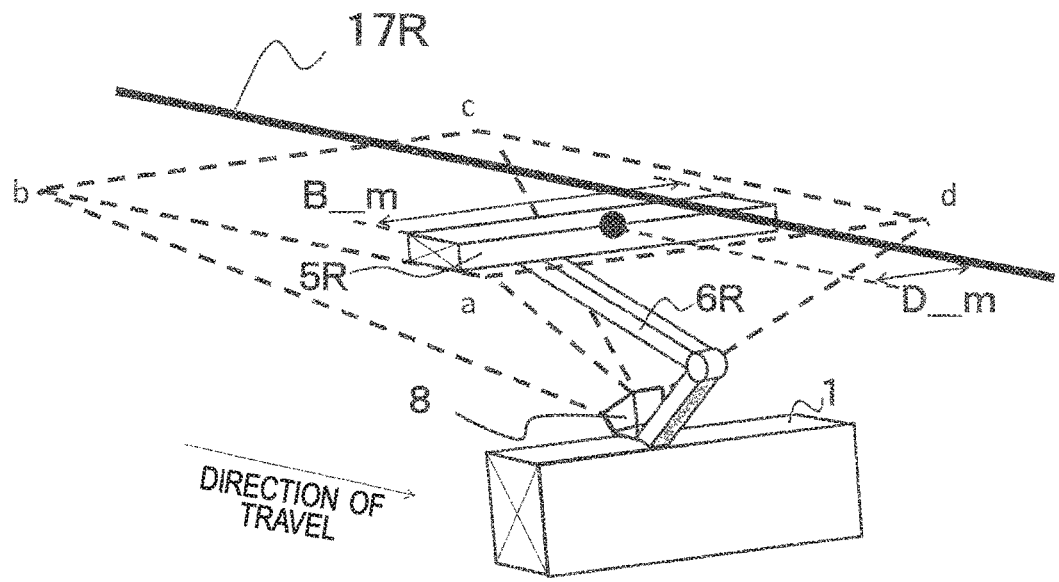
FIG. 7 is an illustration showing the photographing range of a camera.
Figure 8:
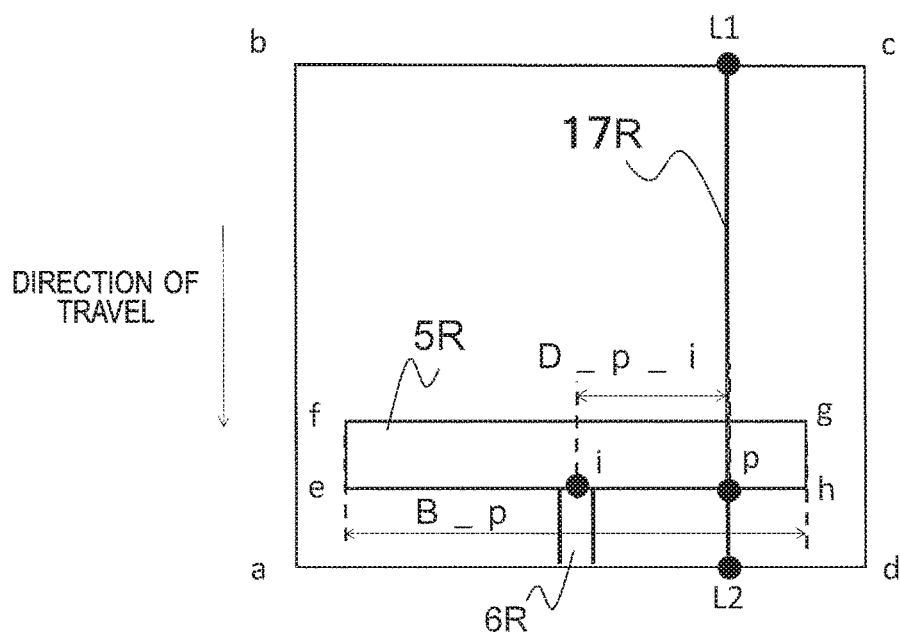
FIG. 8 is an illustration showing image information of an image area a-b-c-d taken by the camera.

With reference to FIG. 7 and FIG. 8, description will be made regarding a method in which the relative distance calculation section 33 calculates the relative distance D_m between the right slider plate 5R and the trolley line 17R. FIG. 7 is an illustration showing the photographing range of the camera 8. FIG. 8 is an illustration showing image information of the image area a-b-c-d taken by the camera 8.

Image data of the image area a-b-c-d (FIG. 7) being taken by the camera 8 is inputted to the relative distance calculation section 33. Then, as shown in FIG. 8, the relative distance calculation section 33 obtains a straight line L1-L2 (trolley line 17R) in the image area a-b-c-d by a well-known line detection technique. Further, the relative distance calculation section 33 uses an image pattern for the right slider plate 5R inputted from the slider plate image storage section 32 and detects an area e-f-g-h corresponding to the right slider plate 5R in the image area a-b-c-d by a pattern matching technique.

The relative distance calculation section 33 locates an intersection p at which of the area e-f-g-h representing the right slider plate 5R, a side e-h on the front side of the vehicle body 3 crosses the straight line L1-L2, and then calculates the number $D\_p\_i$ of relative distance pixels on the taken-in image between the intersection p and a middle point i of the side e-h. In order to calculate the relative distance D_m, width dimension data B_m of the right slider plate 5R stored in the slider plate dimension storage section 31 is inputted to the relative distance calculation section 33. Then, the relative distance calculation section 33 multiplies the number D_p_i of the relative distance pixels on the taken-in image by the width dimension data B_m of the right slider plate 5R and then divides the product by the number B_p of pixels on the image of the right slider plate 5R (the side e-h). That is, by the expression of $D\_m = D\_p\_i \times B\_m / B\_p$, the relative distance calculation section 33 calculates the relative distance D_m. Then, the relative distance calculation section 33 outputs the calculated relative distance D_m to the synthesized bird's eye view image generation section 36.

Here, the trolley lines 17L, 17R installed in the mine are large in dip or sag and thus, the right slider plate 5R is largely moved in the vertical direction to keep the contact with the trolley line 17R at all times. On the other hand, the position of the camera 8 is fixed. Thus, the dimension of the area e-f-g-h representing the right slider plate 5R in the image area a-b-c-d differs in dependence on the position in the vertical direction of the right slider plate 5R (i.e., expands or contracts). Therefore, in the present embodiment, a plurality of different image patterns of the right slider plate 5R are beforehand stored in the slider plate image storage section 32. Then, the relative distance calculation section 33 executes a pattern matching processing to choose an image pattern that is the highest in the degree of matching, from the different image patterns and calculates the relative distance D_m by the use of the number B_p of pixels on the chosen image pattern.

Figure 9:
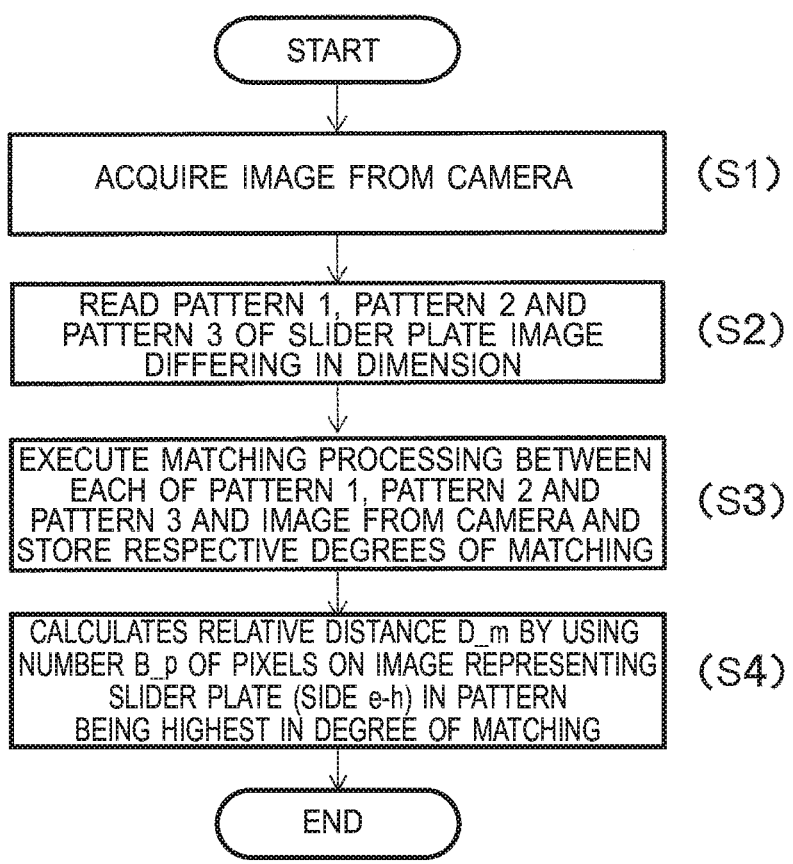
FIG. 9 is a flowchart showing a process for a pattern matching processing.

The process steps for this pattern matching processing will be described with reference to a flowchart shown in FIG. 9. The relative distance calculation section 33 acquires image data taken by the camera 8 (S1). Then, the relative distance calculation section 33 reads therein image patterns 1, 2, 3 for the right slider plate 5R which are stored in the slider plate image storage section 32 (S2). Then, the relative distance calculation section 33 executes the matching processing between each of the image patterns 1, 2, 3 for the right slider plate 5R and the image data taken by the camera 8 and stores respective matching degrees with the respective image patterns 1, 2, 3 in a RAM (Read Only Memory, not shown) (S3). Subsequently, the relative distance calculation section 33 calculates the relative distance D_m by using the number B_p of pixels on the image of the side e-h of the right slider plate 5R in the slider plate image pattern that is the highest in matching degree (S4).

By executing the matching processing like this, it is possible to precisely calculate the relative distance D_m even in the case that the height of the slider plates 5L, 5R fluctuates largely in the state that the trolley lines 17 dip or sag as is the case in the mine. It is needless to say that where the moving amount of the right slider plate 5R in the vertical direction is not large, one typical pattern may suffice for the imager pattern to be stored in the slider plate image storage section 32.

Figure 10:
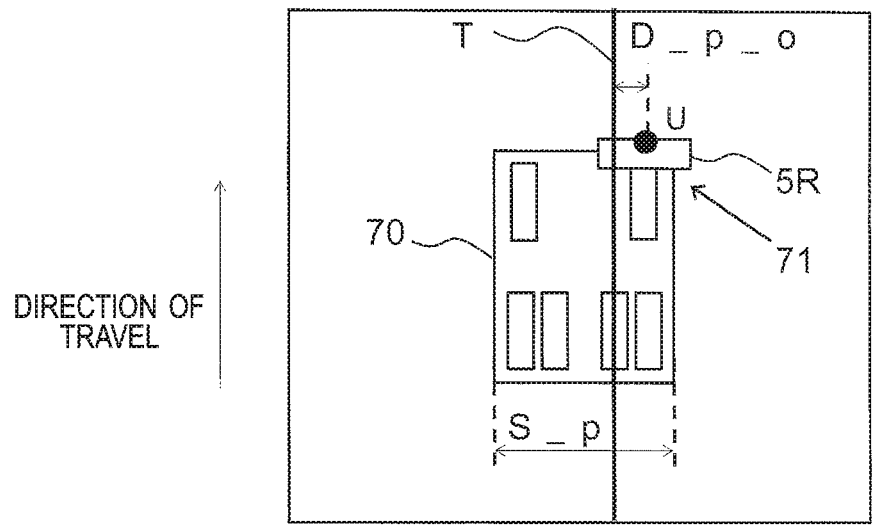
FIG. 10 is an illustration showing a specific example of a bird's eye view image displayed on a monitor.

Next, the generation processing for the bird's eye view image by the synthesized bird's eye view image generation section 36 will be described by taking a specific example of the bird's eye view image shown in FIG. 10. The synthesized bird's eye view image generation section 36 inputs from the symbol dimension storage section 34 the number S_p of pixels that corresponds to the vehicle width in a first symbol image 70 showing the whole of the dump truck 1. In order to obtain the number D_p_o of the relative distance pixels between the trolley line T and the center U of the right slider plate 5R on the bird's eye view image, the synthesized bird's eye view image generation section 36 multiplies the relative distance D_m inputted from the relative distance calculation section 33 by the number S_p of pixels corresponding to the vehicle width on the first symbol image 70 and then, divides the product by a width dimension S_m (refer to FIG. 3) of the dump truck 1. That is, by the expression of $D\_p\_o = D\_m \times S\_p / S\_m$, the synthesized bird's eye view image generation section 36 calculates the number D_p_o of the relative distance pixels.

Thereafter, the synthesized bird's eye view image generation section 36 synthesizes on the first symbol image 70 a second symbol image 71 that is configured by depicting a straight line T disguised as the trolley line 17R at a position spaced by the number D_p_o of the relative distance pixels from the center U of the symbol image representing the right slider plate 5R. In this way, the bird's eye view image is generated that represents the positional relation between the right slider plate 5R of the dump truck 1 and the trolley line 17R. Bird's eye view image data generated by the synthesized bird's eye view image generation section 36 is outputted to the monitor 24, whereby the bird's eye view image shown in FIG. 10 is displayed on the monitor 24.

As having been described hereinabove, according to the present invention, when the trolley line 17R moves on the right slider plate 5R in a right-left direction, the relative position D_m between the right slider plate 5R and the trolley line 17R changes, and thus, the straight line T indicating the position of the trolley line 17R displayed on the monitor 24 moves relative to the right slider plate 5R in the right-left direction. In this case, the information displayed on the monitor 24 is the symbol image in which the whole of the dump truck 1 and the trolley line 17 are overlooked from above, so that the driver can easily grasp the positional relation between the dump truck 1 and the trolley line 17R. Consequently, it is possible to mitigate the burden in steering operation that is imposed on the driver during the traveling in the trolley mode.

Further, since the configuration is taken that the camera 8 takes the images of the trolley line 17R on the ground side and the right slider plate 5R, influences of noises are little. Thus, the calculation for the relative distance D_m can be done more accurately than the case where the camera 8 takes the images of the trolley line 17L on the high-voltage side and the left slider plate 5L. As a result, it is possible to generate the bird's eye view image that is more accurate. In short, according to the present embodiment, the information on the positional relation between the dump truck 1 and the trolley line 17R is accurate (i.e., highly reliable).

In the present embodiment, there is taken a configuration that the second symbol image 71 representing the right slider plate 5R and the trolley line 17R can be displayed in an enlarged scale while the first symbol image 70 representing the whole of the dump truck 1 remains as it is. For example, it is possible to display the second symbol image 71 in an enlarged/reduced scale by manipulating an operation button (not shown) on the monitor 24.

Figure 11:
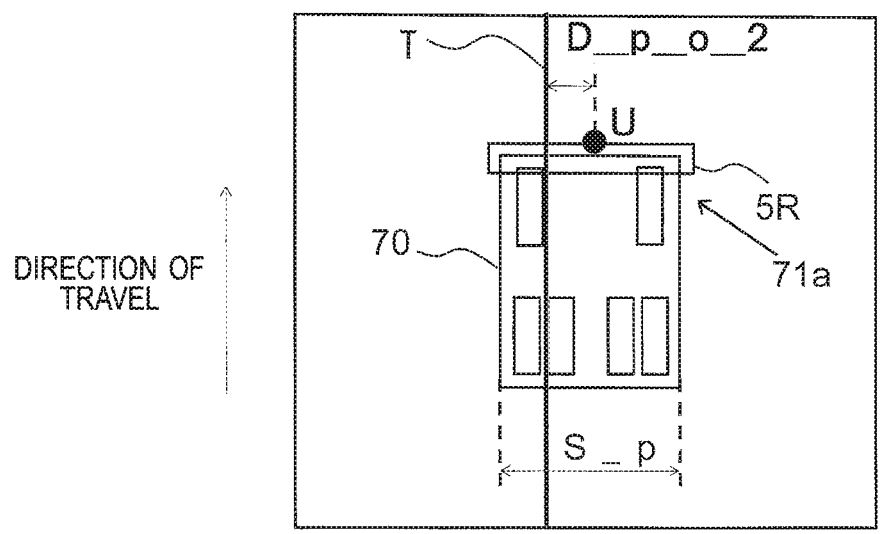
FIG. 11 is an illustration showing an example in which a right slider plate part itself in the bird's eye view image is displayed in an enlarged scale.
Figure 12:
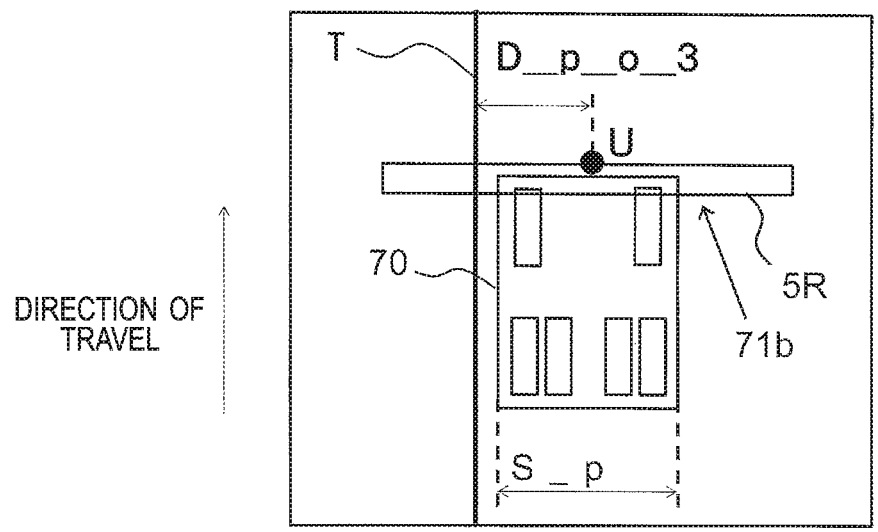
FIG. 12 is an illustration showing an example in which the right slider plate part itself in the bird's eye view image is displayed in a more enlarged scale.
Figure 13:
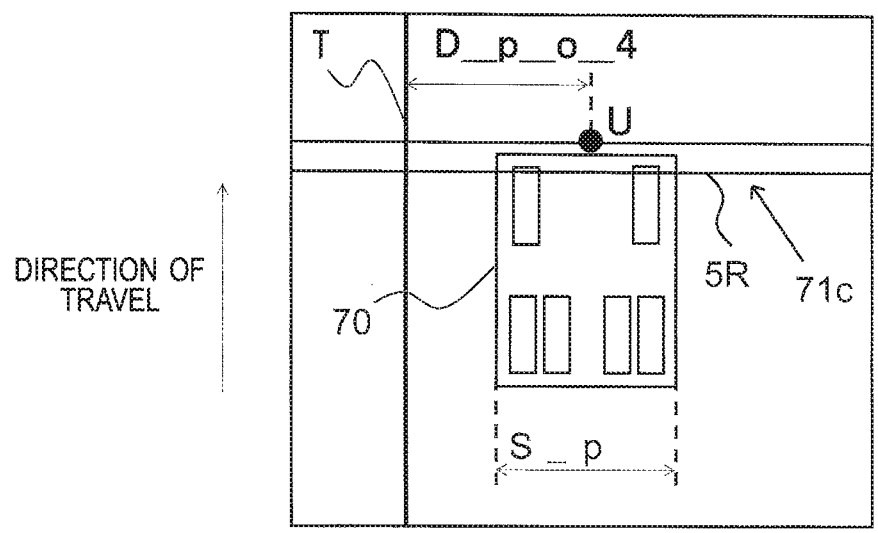
FIG. 13 is an illustration showing an example in which the right slider plate part itself in the bird's eye view image is displayed in a much more enlarged scale.

FIG. 11 to FIG. 13 show examples of the bird's eye view image displayed in various enlarged scales. FIG. 11 is an illustration in which the second symbol image (denoted as 71a in this figure) representing the right slider plate 5R and the straight line T is enlarged to a dimension corresponding to the vehicle width of the dump truck 1. As shown in FIG. 11, the enlarged display expands the distance between the center U and the straight line T to D_p_o_2. FIG. 12 is an illustration in which the second symbol image (denoted as 71b in this figure) representing the right slider plate 5R and the straight line T is enlarged to the degree of twice the vehicle width of the dump truck 1. As shown in FIG. 12, this enlarged display expands the distance between the center U and the straight line T to D_p_o_3. FIG. 13 is an illustration in which the second symbol image (denoted as 71c in this figure) representing the right slider plate 5R and the straight line T is enlarged to the degree of three times the vehicle width of the dump truck 1. As shown in FIG. 13, this enlarged display expands the distance between the center U and the straight line T to D_p_o_4. Like this, according to the present embodiment, the symbol image at the right slider plate 5R part itself can be displayed in the enlarged scale determined by the driver's preference, so that the positional relation between the trolley line (straight line T) and the right slider plate 5R becomes further easier for the driver to grasp.

It is to be noted that the foregoing embodiment is an exemplification for the purpose of describing the present invention and thus, that the present invention is not intended to be limited only to the foregoing embodiment. Any person ordinarily skilled in the art may implement the present invention in various other forms without departing from the gist of the present invention. For example, the function that displays the symbol image of the right slider plate 5R part itself on the monitor 24 in the enlarged or reduced scale is not necessarily required to be installed. Further, the example has been cited that the first symbol image 70 representing the whole of the dump truck 1 is displayed on the monitor 24. However, in the viewpoint that the relative distance between the trolley line 17R and the right slider plate 5R can easily be grasped in relation with the vehicle width of the dump truck 1, the symbol image is sufficient if the same can represent the entire vehicle width at least at the front part of the dump truck 1. For example, there may be taken a configuration that displays on the monitor 24 a bird's eye view image representing the front half of the dump truck 1.

What is claimed is:

1. An electric drive vehicle that travels while receiving electric power from an electric power supply facility which completes an electric closed circuit by a trolley line on a high-voltage side and a trolley line on a ground side, the electric drive vehicle comprising:
   a first slider plate contacting the trolley line on the high-voltage side;
   a second slider plate contacting the trolley line on the ground side;
   a camera installed below the second slider plate for taking as a photographing range the whole of the second slider plate and a part of the trolley line on the ground side residing around the second slider plate;
   a monitor that displays information for supporting the driving; and
   a controller configured to execute display control of the monitor,
   wherein the controller has:
      a slider plate image storage section that stores a plurality of image patterns for the second slider plate;
      a relative distance calculation section that is connected to the slider plate image storage section and the camera, and that receives the plurality of image patterns for the second slider plate from the slider plate image storage section, receives image data taken by the camera and calculates a relative distance between the trolley line on the ground side and a reference position of the second slider plate based on the plurality of image patterns and the image data; and
      a synthesized bird's eye view image generation section that is connected to the relative distance calculation section and the monitor, and that receives the relative distance as a calculation result from the relative distance calculation section, generates bird's eye view image data by synthesizing a second symbol image representing the trolley line on the ground side and the second slider plate which reflect the relative distance, on a first symbol image representing the electric drive vehicle, and outputs the bird's eye view image data to the monitor.

2. The electric drive vehicle according to claim 1, wherein the controller further has:

a symbol dimension storage section that stores a number of pixels representing a vehicle width of the first symbol image, and the first symbol image is an image representing at least the whole of the vehicle width of the electric drive vehicle and the first symbol image is displayed with the number of pixels representing the vehicle width stored in the symbol dimension storage section.

3. The electric drive vehicle according to claim 2, wherein:

when receiving a signal output by a predetermined operation performed on the monitor, the synthesized bird's eye view image generation section synthesizes the second symbol image enlarged or reduced in scale on the first symbol image to generate the bird's eye view image data.

4. The electric drive vehicle according to claim 1, wherein:

the relative distance calculation section executes a matching processing between the image data taken by the camera and each of the plurality of image patterns stored in the slider plate image storage section, and the relative distance calculation section calculates the relative distance based on one of the image patterns which is highest in a degree of matching with the image data taken by the camera as a result of the matching processing.

5. The electric drive vehicle according to claim 1, wherein:

the synthesized bird's eye view image generation section synthesizes the second symbol image to be enlarged in scale on the first symbol image to generate the bird's eye view image data while making a display scale of the first symbol image remain as it is.

* * * * *